(12) United States Patent
Yamazaki et al.

(10) Patent No.: US 8,657,540 B2
(45) Date of Patent: Feb. 25, 2014

(54) CUTTING INSERT

(75) Inventors: Kazuya Yamazaki, Joso (JP); Kenji Sugawara, Joso (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/545,952

(22) Filed: Jul. 10, 2012

(65) Prior Publication Data
US 2012/0275869 A1 Nov. 1, 2012

Related U.S. Application Data

(63) Continuation of application No. 12/041,725, filed on Mar. 4, 2008, now abandoned.

(30) Foreign Application Priority Data

Mar. 7, 2007 (JP) .................................. 2007-056975

(51) Int. Cl.
*B23P 15/28* (2006.01)
(52) U.S. Cl.
USPC .......................................... 407/114; 407/116
(58) Field of Classification Search
USPC ................... 407/114, 113, 115, 116
See application file for complete search history.

(56) References Cited

U.S. PATENT DOCUMENTS

| | | | |
|---|---|---|---|
| 3,786,540 A * | 1/1974 | Lundgren | 407/113 |
| 3,947,937 A | 4/1976 | Hartel | |
| 4,064,784 A * | 12/1977 | Adler | 411/387.8 |
| 5,044,839 A * | 9/1991 | Takahashi | 407/114 |
| 5,141,367 A * | 8/1992 | Beeghly et al. | 407/119 |
| 5,282,703 A * | 2/1994 | Itaba et al. | 407/114 |
| 5,630,681 A | 5/1997 | Paya | |
| 5,772,366 A * | 6/1998 | Wiman et al. | 407/119 |
| 5,791,833 A * | 8/1998 | Niebauer | 407/114 |
| 5,803,675 A * | 9/1998 | Von Haas | 407/107 |
| 5,947,651 A | 9/1999 | Murakami et al. | |
| 6,065,907 A * | 5/2000 | Ghosh et al. | 407/114 |
| 6,170,576 B1 * | 1/2001 | Brunnert et al. | 166/298 |

(Continued)

FOREIGN PATENT DOCUMENTS

| | | |
|---|---|---|
| CN | 1615196 A | 5/2005 |
| EP | 0857531 A1 | 8/1998 |

(Continued)

OTHER PUBLICATIONS

Translation of Agustin, From EPO. (Machine Translation).

(Continued)

*Primary Examiner* — Sean Michalski
(74) *Attorney, Agent, or Firm* — Leason Ellis LLP.

(57) ABSTRACT

In a cutting insert, a cutting edge is formed on a peripheral border of a rake face; a protruding section is formed on the rake face; a pair of convex sections is formed so as to extend toward the cutting edge; the convex sections face toward a corner portion; the convex sections include first wall surfaces and second wall surfaces; the first wall surfaces and the second wall surfaces are inclined surfaces that are inclined toward the rake face as those are farther from ridgelines intersecting with each other; and the intersection ridgelines intersect with a wall surface of the protruding section, at a position lower than a top portion of the protruding section in the corner portion side.

6 Claims, 11 Drawing Sheets

(56) References Cited

U.S. PATENT DOCUMENTS

| | | | |
|---|---|---|---|
| 6,267,541 B1 * | 7/2001 | Isakov et al. | 407/114 |
| D487,757 S * | 3/2004 | Kasperik et al. | D15/139 |
| D487,758 S * | 3/2004 | Kasperik et al. | D15/139 |
| D487,759 S * | 3/2004 | Kasperik et al. | D15/139 |
| 6,848,868 B2 * | 2/2005 | Kasperik | 407/114 |
| D522,025 S * | 5/2006 | Niebauer et al. | D15/139 |
| 7,182,555 B2 * | 2/2007 | Kitagawa et al. | 407/113 |
| 2010/0278599 A1 * | 11/2010 | Zitzlaff et al. | 407/114 |

FOREIGN PATENT DOCUMENTS

| | | |
|---|---|---|
| EP | 1454690 A1 | 9/2004 |
| JP | 06-079505 A | 3/1994 |
| JP | 07-501271 T | 2/1995 |
| JP | 2004-106150 A | 4/2004 |
| JP | 2006-272548 A | 10/2006 |
| TW | 542760 B | 7/2003 |
| WO | WO-94/25208 A1 | 11/1994 |

OTHER PUBLICATIONS

Office Action mailed Jan. 27, 2011 for the prior U.S. Appl. No. 12/041,725.
Office Action mailed May 27, 2011 for the prior U.S. Appl. No. 12/041,725.
Office Action mailed Apr. 10, 2012 for the prior U.S. Appl. No. 12/041,725.
European Search Report issued Mar. 10, 2010 for the corresponding European Patent Application No. 08004035.5.
Chinese Office Action mailed Apr. 8, 2011 for the corresponding Chinese patent application No. 200810082598.8.
Office Action of the corresponding Japanese Application No. 2007-056975 mailed Nov. 29, 2011.
Office Action of the corresponding Chinese Application No. 200810082598.8 mailed Feb. 22, 2012.

* cited by examiner

CUTTING INSERT

This application is a Continuation of U.S. patent application Ser. No. 12/041,725, filed Mar. 4, 2008, which claims the benefit of Japanese Patent Application No. 2007-056975, filed Mar. 7, 2007, the contents of all of which are incorporated herein by reference.

BACKGROUND OF THE INVENTION

1. Field of the Invention

The present invention relates to a cutting insert mounted on a replaceable insert turning tool and capable of reliably disposing of cutting chips produced under various cutting conditions from a medium cutting for cutting relatively a large amount to a light cutting such as a finish cutting for cutting a small amount.

2. Description of the Related Art

Such a cutting insert capable of reliably disposing of cutting chips produced under various cutting conditions from the medium cutting to the finish cutting is discussed in, for example, Japanese Unexamined Patent Application, First Publication No. 2006-272548. In the cutting insert, a breaker groove is formed along a cutting edge on a rake face. A protrusion of a boss surface extends to a corner portion of the cutting edge. The tip of the protrusion shows a concave shape surrounding the corner portion as seen from a plane. A standing face protruding to be longest near the cutting edge from two top portions of the protrusion showing the concave shape is formed. The standing angle of the corner is 10 to 30 degrees. The standing face is formed farther than the cutting edge as it is distanced from the corner portion.

However, the cutting insert described in Japanese Unexamined Patent Application, First Publication No. 2006-272548, the standing face protrudes from two top portions of the protrusion to the rake face near the cutting edge. Thus, it is difficult to form the aforementioned standing angle since a gradient of the standing face is steep based on a protrusion height of the top portion of the protrusion and a distance from the top portion to the cutting edge. Accordingly, in the medium cutting for cutting relatively large amount, the standing face is prematurely abraded by contacting with cutting chips, and there is concern that durability of the insert is deteriorated. On the other hand, when the protrusion height of the top portion of the protrusion is set small in order to make the standing angle be in the range, the cutting chips produced in the process of the finish cutting for cutting small amount overflow out of the protrusion. As a result, it is difficult to smoothly dispose of the cutting chips.

The present invention has been made in consideration of the aforementioned situations, and has an object of providing a cutting insert capable of reliably disposing of cutting chips even in a finish cutting and having long durability even in a medium cutting.

SUMMARY OF THE INVENTION

To solve the problems and achieve the object, the followings are employed in the present invention.
(1) Specifically, a cutting insert according to an aspect of the present invention is configured so that: a cutting edge having a corner portion is formed on a peripheral border of a rake face of an insert body; a protruding section is formed on the rake face inside the corner portion so as to protrude at a distance away from the cutting edge; a pair of convex sections is formed on both sides of the corner portion divided by a bisector in the range from a wall surface of the protruding section to the rake face so as to extend toward the cutting edge; the convex sections face toward the corner portion of the cutting edge; the convex sections include first wall surfaces that more separated from each other to extend toward both ends of the corner portion, respectively, as the first wall surfaces are farther from the wall surface of the protruding section and closer to the cutting edge, and second wall surfaces that extend toward the cutting edge adjoined to the both ends of the corner portion by intersecting with the first wall surfaces; the first wall surfaces and the second wall surfaces are inclined surfaces that are inclined toward the rake face as those are farther from ridgelines intersecting with each other; and the intersection ridgelines intersect with the wall surface of the protruding section, at a position lower than a top portion of the protruding section in the corner portion side.

According to the cutting insert, the cutting chips are produced in the corner portion of the cutting edge at the time of a finish cutting for cutting small amount. In this case, the cutting chips scrape the rake face and flow out through the gaps between the first wall surfaces of the pair of convex sections. Then, the cutting chips are guided by the first wall surfaces, and the cutting chips are curled by colliding against the wall surface of the protruding section. Thus, the cutting chips are disposed of. Here, in the convex section, the intersection ridgelines of the first wall surfaces and the second wall surfaces intersect with the wall surface of the protruding section at a position lower than the top portion of the corner portion side in the protruding section. That is, the protrusion height of the top portion in the protruding section is set higher than the intersection points between the intersection ridgelines and the wall surface of the protruding section. Thus, it is possible to prevent the cutting chip produced at the time of the finish cutting from overflowing out of the protruding section.

On the other hand, at the time of the medium cutting for cutting relatively large amount, the cutting chips are produced in the range from the corner portion of the cutting edge to a part of the cutting edge adjoined to one end of the corner portion. The produced cutting chips are in contact with the second wall surfaces of the convex section in the one end side of the corner portion. However, in the cutting insert according to the configuration mentioned above, the intersection ridgelines between the second wall surfaces and the first wall surfaces are formed on the wall surface of the protruding section at a position lower than the top portion of the protruding section as described above. Thus, an angle of the second wall surfaces with respect to the rake face side can be reduced without regard to the protrusion height of the top portion and the distance of the cutting edge. Accordingly, it is possible to suppress the resistance caused by the contact of the cutting chips at the time of the medium cutting. Further, since the convex section extends from the wall surface of the protruding section, it is possible to secure a thickness thereof enough for the convex section in the protruding section side of the second wall surfaces. Therefore, it is possible to stably dispose of cutting chips during a long term by suppressing abrasion of the convex section. In addition, the wall surface of the protruding section is highly inclined to be substantially vertical in the protruding section side of the second wall surfaces. Therefore, the cutting chips contacting with the second wall surfaces can be reliably disposed of by colliding against the wall surface of the protruding section.

(2) A tilt angle of the second wall surfaces in a cross section orthogonal to the cutting edge adjoined to the both ends of the corner portion may be set smaller than a tilt angle of the first wall surfaces in the cross section orthogonal to the intersection ridgelines.

In this case, in the second wall surfaces, it is possible to further more suppress the resistance of the cutting chips produced through a part of the cutting edge adjoined to the one end of the corner portion at the time of the medium cutting. In the first wall surfaces, it is possible to further reliably guide and collide the cutting chips produced at the time of the light cutting to the wall surface of the protruding section.

(3) The second wall surfaces may be formed as a convex curve surface curved toward the rake face.

In this case, it is possible to reduce an area where the cutting chips produced at the time of the medium cutting are in contact with the second wall surfaces.

(4) The wall surface of the protruding section facing to the corner portion between the first wall surfaces of the pair of convex sections may be formed as a convex curve surface curved along the corner portion. In this case, it is possible to reduce an area where the cutting chips colliding against the wall surface of the protruding section at the time of the finish cutting are in contact with the wall surface.

(5) In a part between the first wall surfaces of the pair of convex sections, the rake face may be formed to extend in the state from the corner portion of the cutting edge. Meanwhile, a rib section having a lower protrusion height than the convex section and a narrower width than a distance between the first wall surfaces may be formed along the bisector between the first wall surfaces of the pair of convex sections on the rake face inside the corner portion.

In this case, in not only a general lathe turning but also particularly a copy turning, it is possible to control the cutting chips having a narrow width and produced at the time of the finish cutting by using the rib section.

Specifically, in the finish cutting of the lathe turning, cutting chips having narrow widths are produced by the tip of the cutting edge on the bisector of the corner portion and flow out along the bisector. In the finish cutting of the copy turning, cutting chips flow out along the bisector while an outflow direction of the cutting chips is changed. In the cases, when the cutting chips flow out along the bisector, the cutting chips scrape while moving up on the protruding ridge portion which is a ridgeline of the rib section. In this case, the cutting chips are curled by resistance due to the scrape, and collide against any one of the first wall surfaces in the pair of convex sections positioned on both sides of the rib section, so that the cutting chips are broken into small pieces while the outflow direction thereof is guided.

In the finish cutting of the copy turning, the cutting chips are produced in some range from the tip of the cutting edge to any one side of the bisector in the corner portion. The cutting chips, while scraping the rake face, flow out from the one side to the inside thereof, so that the cutting chips collide against a side surface of the rib section. As a result, the cutting chips are curled by resistance due to the scrape on the rake face, and the outflow direction of the cutting chips is guided by the side surface of the rib section. In addition, even in the case of the copy turning or in the aforementioned case of the lathe turning, the cutting chips are reliably disposed of by colliding against one of the first wall surfaces in the pair of convex sections and the wall surface of the protruding section more inside than the rib section.

In addition, in the case of the finish cutting, cutting chips flow out along the bisector at the time of the lathe turning and the like and scrape the protruding ridge portion of the rib section. When the protrusion height of the rib section is higher than the pair of convex sections, there is concern that it becomes difficult to control the cutting chips that do not collide against the convex section or it is caused to block by the cutting chips that collide against the side surface of the rib section at the time of the copy turning. In addition, there is provided such a rib section. Therefore, even when the convex section abrades from the second wall surfaces in the case of the medium cutting, the cutting chips are curled by the resistance due to the collision against the rib section, so that it is possible to dispose of the cutting chips.

(6) The cutting insert may be configured so that: the protrusion height of the top portion in the protruding section is a higher planar surface than the cutting edge in the corner portion; the wall surface of the protruding section is an inclined surface that is gradually uplifted toward the top portion as it gets closer to the inside of the corner portion; the rake face inside the corner portion includes a positive rake face that is gradually recessed as it gets closer to the inside of the corner portion and a flat lake face inside the positive rake face; and a protruding ridge portion of the rib section is formed at a distance away from the cutting edge and be gradually uplifted with a lower inclination than the wall surface of the protruding section.

In this case, the rib section is reliably formed between the wall surface of the protruding section and the positive rake face, and the cutting chips can be effectively disposed of in the finish cutting of the lathe turning and the copy turning. In addition, in order to more reliably dispose of the cutting chips in the finish cutting by using the rib section, it is preferred that the protruding ridge portion be parallel to the top portion of the protruding section or be inclined to be uplifted or be recessed at an extremely slight angle of five or less degrees with respect to the top portion as described above.

(7) The cutting insert may be configured so that: the protruding section is a planar surface in which the protrusion height of the top portion is higher than the cutting edge in the corner portion; the wall surface of the protruding section is an inclined surface that is gradually uplifted toward the top portion as it gets closer to the inside of the corner portion; the rake face inside the corner portion includes a positive rake face that is gradually recessed as it gets closer to the inside of the corner portion and a flat rake face inside the positive rake face; and a protruding ridge portion of the rib section is formed at a distance away from the cutting edge and extends so as to be gradually uplifted with a lower inclination than the wall surface of the protruding section toward the inside of the corner portion from the flat rake face.

In this case, the protruding ridge portion of the rib section is formed to be uplifted from the rake face more inside than the convex section in the bisector direction.

According to the present invention as described above, it is possible to reliably dispose of cutting chips in the finish cutting for cutting small amount. In addition, it is also possible to provide a cutting insert, which has long durability, capable of stably disposing of cutting chips during a long term by suppressing abrasion of the convex section even in the medium cutting for cutting relatively large amount.

DETAILED DESCRIPTION OF THE INVENTION

Figure 1:
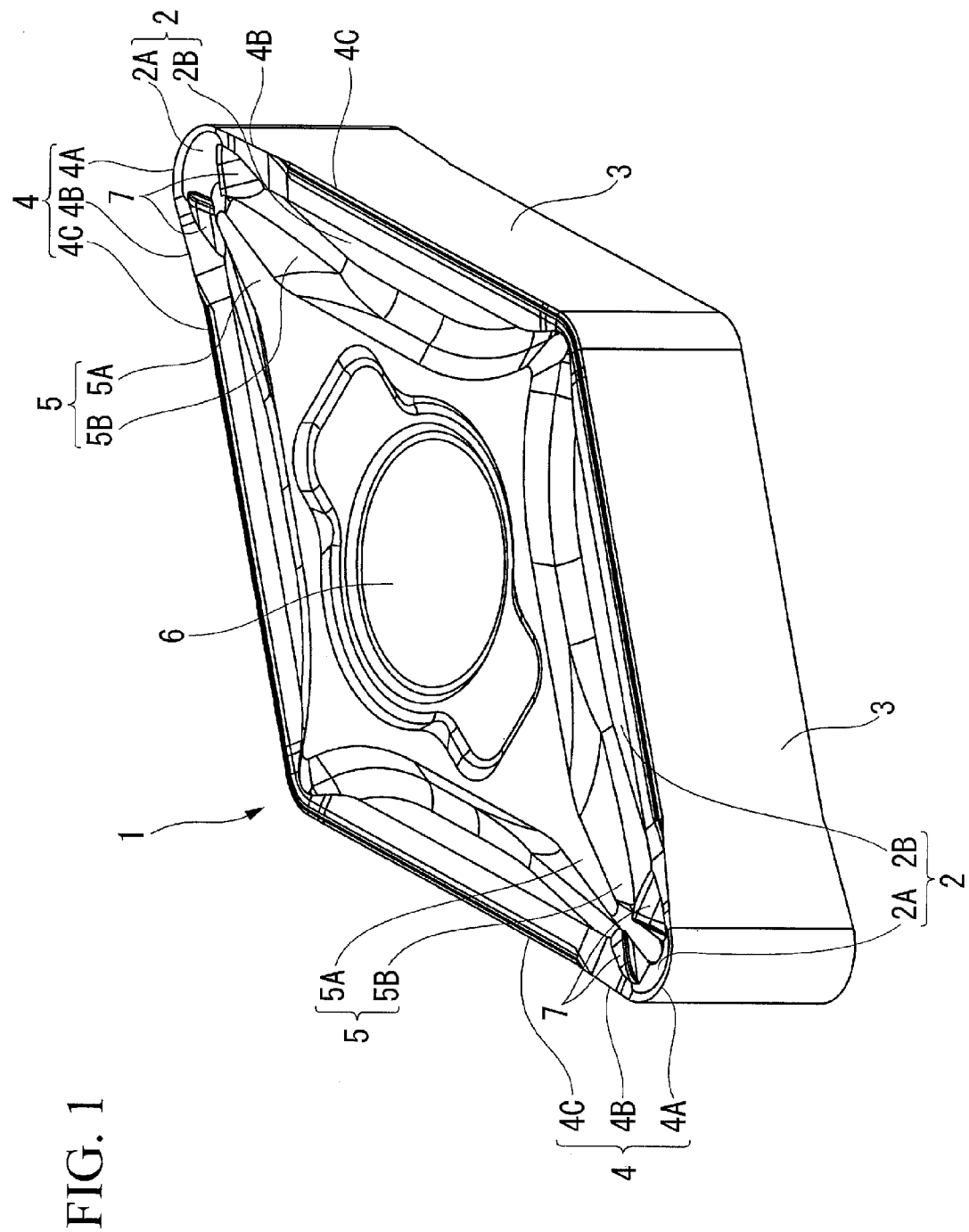
FIG. 1 is a perspective view illustrating a cutting insert according to a first embodiment of the present invention.
Figure 2:
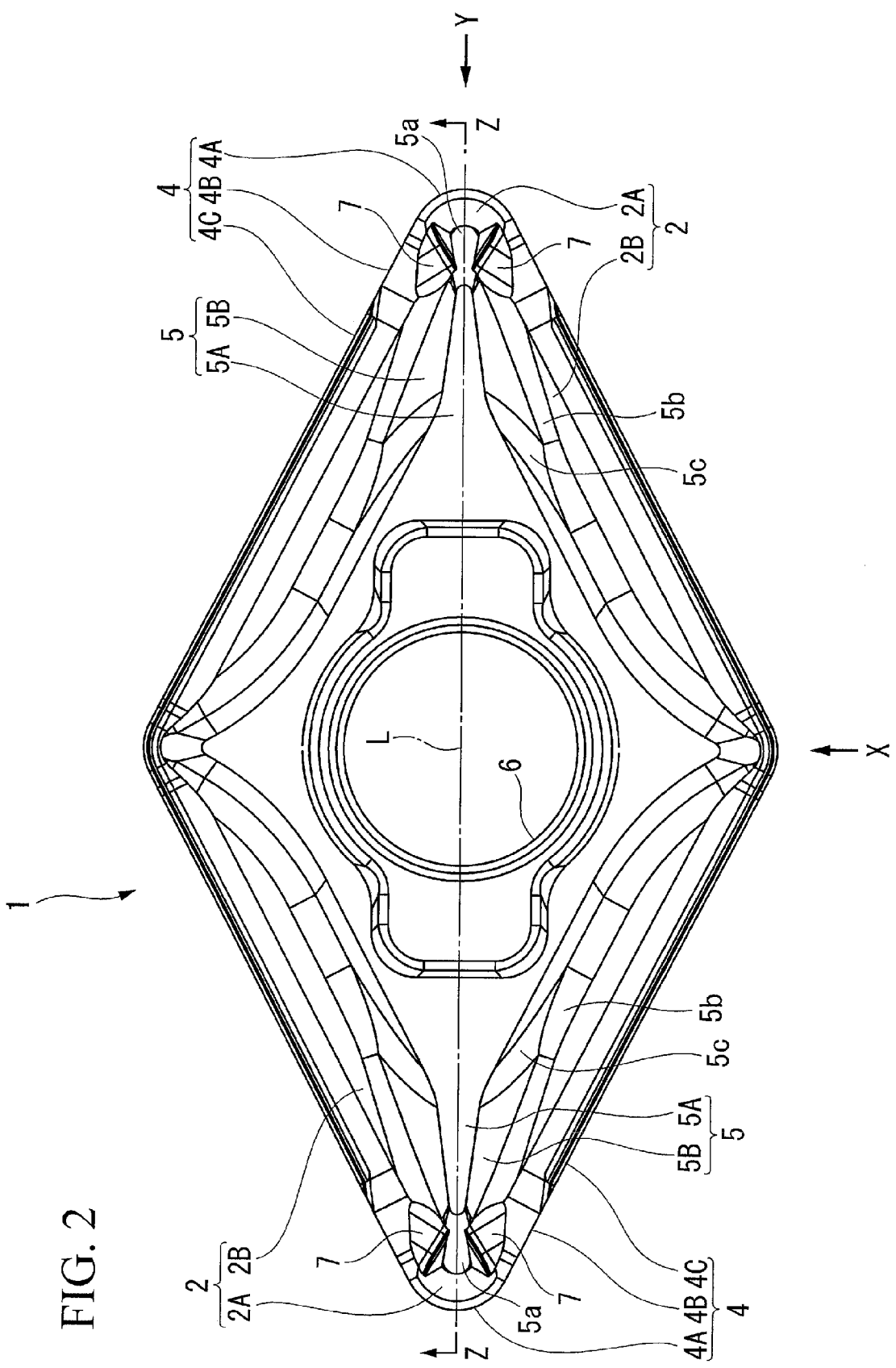
FIG. 2 is a top view illustrating an insert body 1 according to the first embodiment as viewed in a direction of the thickness thereof.
Figure 3:
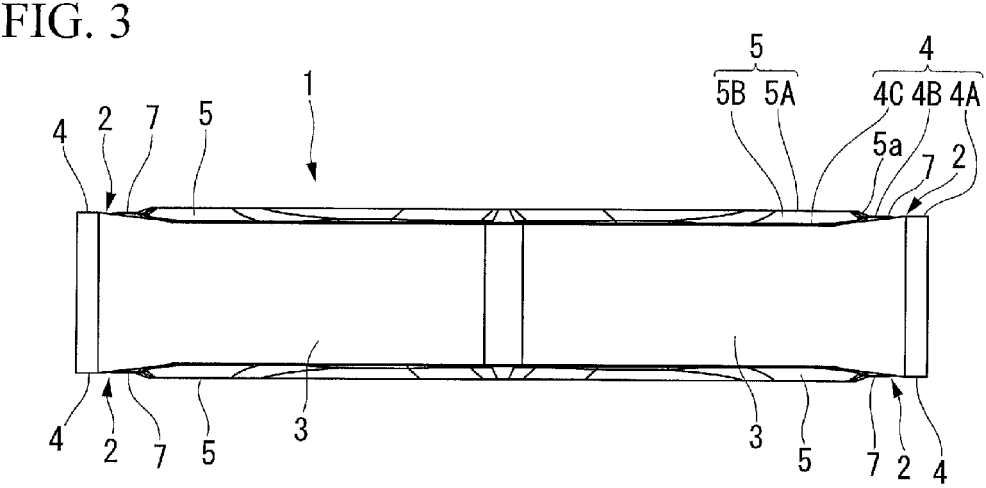
FIG. 3 is a side view as viewed in an X direction in FIG. 2.
Figure 4:
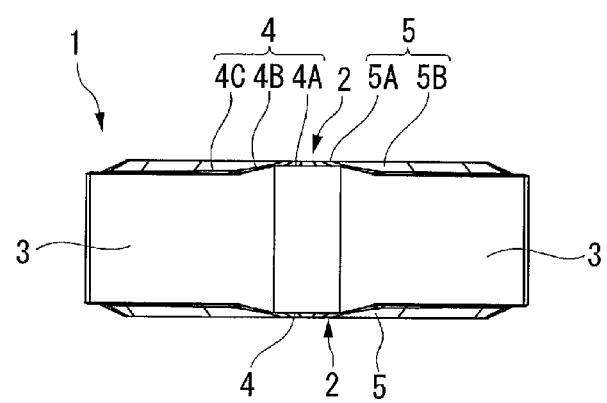
FIG. 4 is a side view as viewed in a Y direction in FIG. 2.
Figure 5:
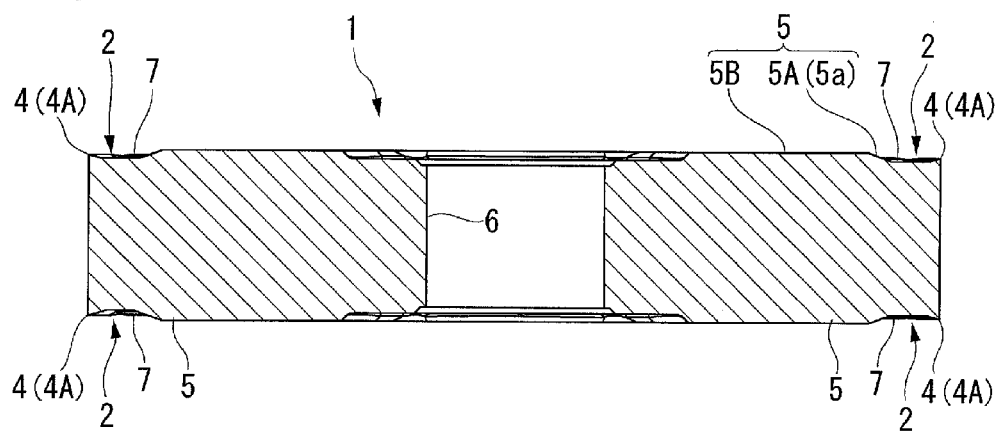
FIG. 5 is a sectional view taken along a line Z-Z in FIG. 2.
Figure 6:
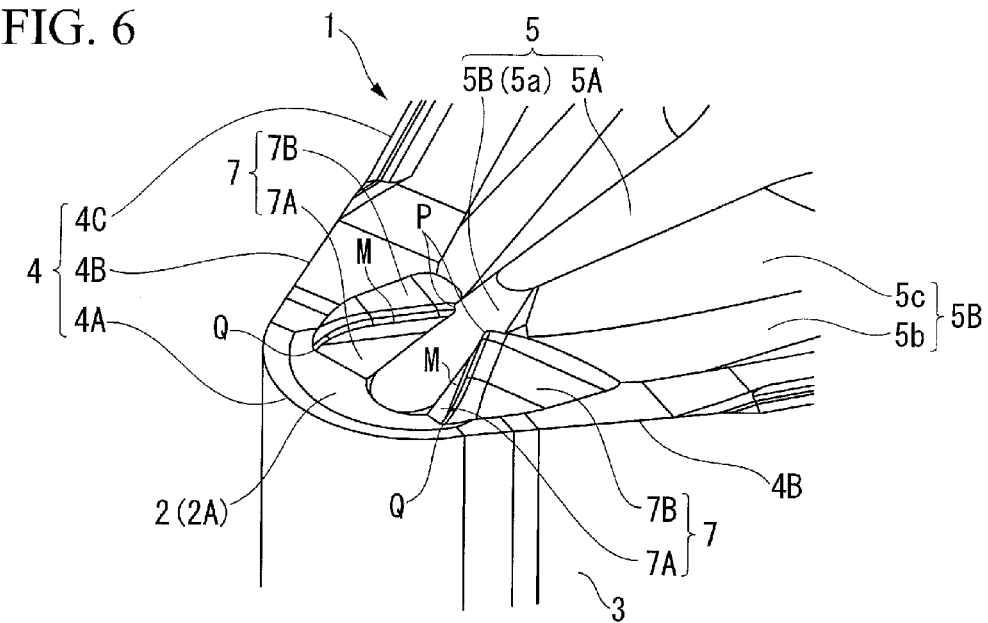
FIG. 6 is an enlarged perspective view illustrating the periphery of a corner portion 4A of a cutting edge 4 according to the first embodiment.

FIGS. 1 to 9 show a first embodiment of the present invention. According to the embodiment, the insert body 1 is formed in a polygonal plate shape (particularly a rhombic plate shape) by hard material such as sintered hard alloy. The insert body 1 is configured as a negative type insert in which rake faces 2 are formed on the pair of rhombus-shaped surfaces and flank faces 3 disposed in the vicinity of the rake faces 2 extend parallel to the thickness direction (up and down directions in FIGS. 3 to 5) of the insert body 1. In the insert body 1, the pair of rhombus-shaped surfaces is symmetrically formed to be reversible, is symmetrically formed to be rotated by 180 degrees about the central line of the rhombic plate surfaces, and is symmetrically formed with respect to planes extended in parallel to the thickness direction between rhombus-shaped acute corner portions and obtuse corner portions, respectively.

A cutting edge 4 is formed on peripheral border of the rake face 2. The peripheral border serves as intersection ridgelines portion between the rake face 2 and the flank face 3. The cutting edge 4 has corner portion 4A formed on rhombus-shaped acute corner portions included in the rake faces 2. According to the embodiment, the corner portion 4A is formed in a convex arc shape as seen from the plane in the thickness direction, and extends perpendicular to the thickness direction. In addition, the cutting edge 4 includes a pair of inclined portions 4B that extends as a tangent line of the corner portion 4A as seen from the plane to both ends of the corner portion 4A and is linearly inclined so as to be gradually recessed as it is separated from the corner portion 4A in the thickness direction. The cutting edge 4 also includes linear portions 4C that linearly adjoin the inclined portions 4B to the opposite side of the corner portion 4A of the inclined portions 4B as seen from the plane, and extend toward the rhombus-shaped obtuse corner portion in a direction perpendicular to the thickness direction.

The protruding section 5 is formed on the rake face 2 inside the cutting edge 4 including the corner portion 4A. The protruding section 5 is formed at a distance away from the cutting edge 4 and protrudes in the thickness direction so as to face the rake face 2. The protruding section 5 is a planar surface perpendicular to the thickness direction. The protruding section 5 includes a top portion 5A in which a protrusion height protruding in the thickness direction is higher than the cutting edge 4 and a wall surface 5B that is inclined so as to be gradually uplifted toward the top portion 5A in the thickness direction as it gets closer to the inside of the rake face 2. In the top portion 5A, a mounting hole 6 is formed on the center of the rake face 2 so as to penetrate through the insert body 1 in the thickness direction.

The protruding section 5 is formed so as to gradually narrow the end thereof as it gets closer to the corner portion 4A, as seen from the plane. One part of the wall surface 5B faces to the corner portion 4A passing through a bisector (a bisector of the rhombus-shaped acute corner portion formed by the rake face 2) L of the corner portion 4A, as seen from the plane. The one part thereof is formed in a cone surface shape or a circular truncated cone surface shape of which radius gradually decreases as it gets closer to the cylindrical surface shape, that is, the top portion 5A. The one part thereof is formed as a convex curve surface 5a curved along the corner portion 4A, and is gradually uplifted as it gets closer to the inside of the rake face 2 as described above. On the contrary, the other part of the wall surface 5B is located inside the inclined portions 4B and the linear portions 4C of the cutting edge 4. In a cross section orthogonal to the inclined portions 4B and the linear portions 4C, the other part thereof close to the cutting edge 4 is formed as a convex curve surface 5b having a convex arc shape, and the other part thereof close to the top portion 5A is formed as an inclined surface 5c that is gradually uplifted at a constant angle while smoothly adjoining the convex curve surface 5b, as it gets closer to the inside.

Meanwhile, in the corner portion 4A, a part of the rake face 2 close to the cutting edge 4 is formed as a positive rake face 2A that is gradually recessed in the cross section orthogonal to the cutting edge 4, as it gets closer to the inside. However, according to the embodiment, the positive rake face 2A inside the corner portion 4A is formed of a plurality of positive rake face portions (in the embodiment, the number of those is two) in which a rake angle increases in the range from the cutting edge 4 toward the inside. In the positive rake face portions, a positive rake face portion of the inside has a larger width than a positive rake face portion of the cutting edge 4 side. The positive rake face portion of the inside intersects with the convex curve surface 5a of the wall surface 5B of the protruding section 5. In addition, the rake face 2 of a part adjoined to the inclined portions 4B of the cutting edge 4 is formed as the positive rake face 2A having the same rake angle as the positive rake face portion of the cutting edge 4 side in the positive rake face 2A inside the corner portion 4A, and extends to the convex curve surface 5b of the wall surface 5B of the protruding section 5.

In addition, the rake face 2 of a part adjoined to the linear portions 4C of the cutting edge 4 is sequentially formed of the positive rake face 2A and a flat rake face 2B with a negative land portion and a flat land portion interposed therebetween in a direction from the cutting edge 4 to the inside. The negative land portion intersects with the flank face 3 at an obtuse angle and has extremely narrow width. The flat land portion extends perpendicular to the thickness direction and has a narrow width larger than the width of the negative land portion. The positive rake face 2A has the same rake angle as the positive rake face portion of the cutting edge 4 side in the corner portion 4A. The flat rake face 213 smoothly adjoins the convex curve surface 5b in the wall surface 5B of the protruding section 5 inside the linear portions 4C.

Meanwhile, in the periphery of the corner portion 4A, a pair of convex sections 7 is formed on both sides of the bisector L in the range from the wall surface 5B of the protruding section 5 to the rake face 2 so as to extend to the cutting edge 4 side. The convex sections 7 face to the corner portion 4A side of the cutting edge 4. The convex sections 7 include first wall surfaces 7A that extend to both end sides of the corner portion 4A more separated from each other, respectively, as the first wall surfaces 7A are farther from the wall surface 5B of the protruding section 5 and closer to the cutting edge 4 side, and second wall surfaces 7B that intersect with the first wall surfaces 7A in intersection ridgelines M and extend in directions opposite to each other toward the inclined portions 4B side of the cutting edge 4. In a part of the intersection ridgelines M, rounding is performed on the surface thereof.

In the intersection ridgelines M, intersection points P between the intersection ridgelines M and the wall surface 5B of the protruding section 5 are disposed on a position lower than the top portion 5A in the corner portion 4A side of the protruding section 5 in the thickness direction. That is, a protrusion height of the convex sections 7 is set less than that of the protruding section 5 in the thickness direction. Ion addition, the intersection points P of the pair of convex sections 7 are located on the convex curve surface 5a side in the vicinity of a adjoining portion between a part of the convex curve surface 5a facing to the corner portion 4A and a part extending to the inside of the inclined portions 4B, in a circumferential direction of the wall surface 5B. Between the both first wall surfaces 7A of the convex sections 7, the part of the convex curve surface 5a of the wall surface 5B in the front end of the protruding section 5 extends along the bisector L.

Figure 7:
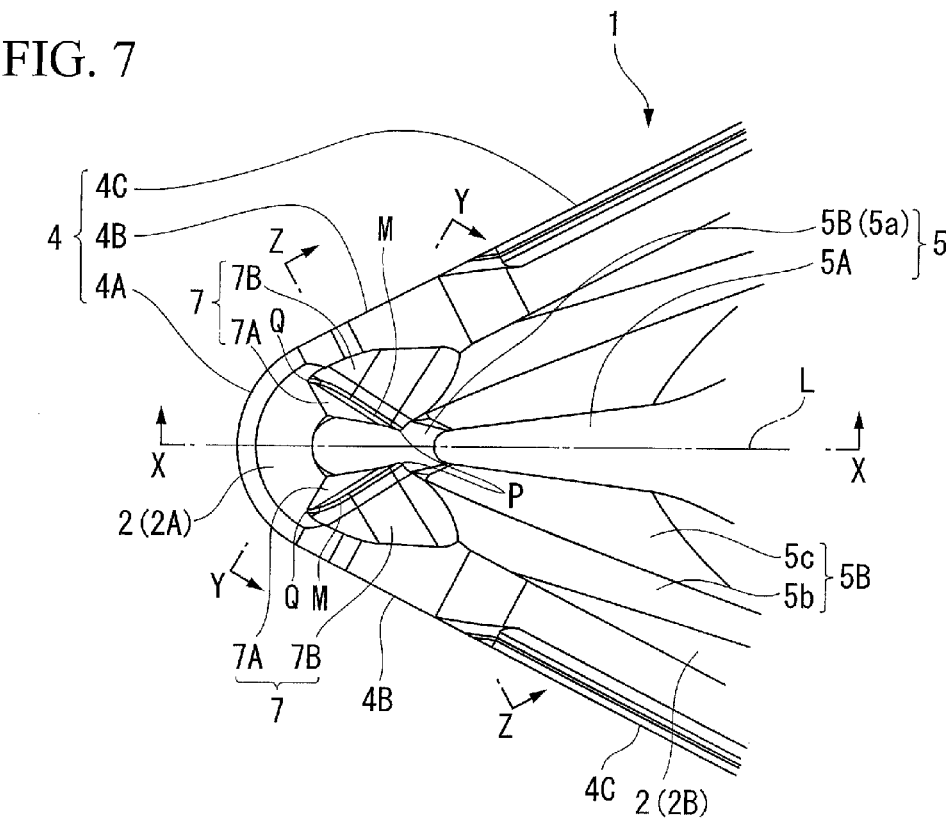
FIG. 7 is an enlarged top view illustrating the periphery of the corner portion 4A of the cutting edge 4 according to the first embodiment.
Figure 8:
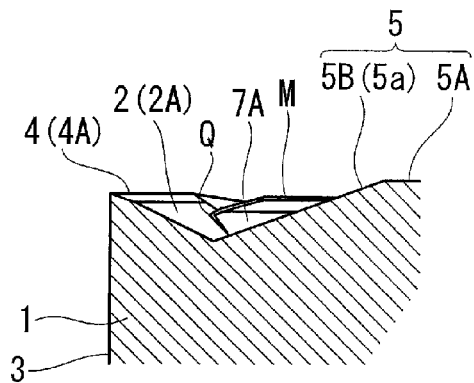
FIG. 8 is a sectional view taken along a line X-X in FIG. 7.

In the embodiment as shown in FIG. 7, the first wall surfaces 7A extend in the range from both ends of the convex curve surface 5a in a curve direction in the wall surface 5B of the protruding section 5 to the inside positive rake face portion adjoined to the protruding section 5 in the two positive rake face portions of the rake face 2 (the positive rake face 2A) adjoined to the corner portion 4A. As shown in FIG. 8, the first wall surfaces 7A are formed as inclined flat surfaces that are gradually inclined so as to be recessed at a constant tilt angle $\alpha$ with respect to a direction perpendicular to the thickness direction in the cross section orthogonal to the intersection ridgelines M, as those get closer to the intersection ridgelines M from the convex curve surface 5a side and the rake face 2 side, respectively. Accordingly, intersection points Q between the intersection ridgelines M and the rake face 2 are disposed at a distance away from the cutting edge 4. In the embodiment, the intersection points Q are located on the inside of the both ends of the corner portion 4A, respectively.

Figure 9:
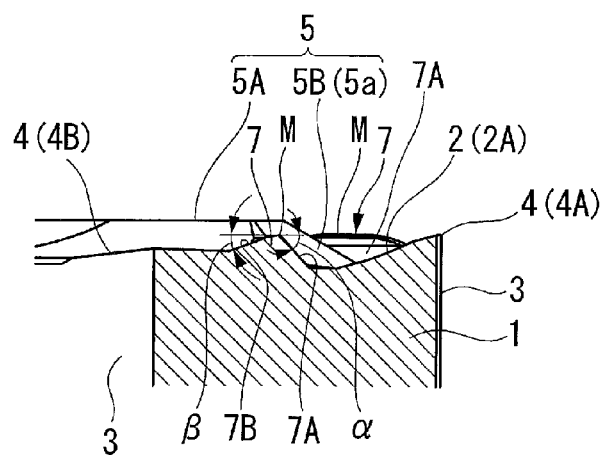
FIG. 9 is a sectional view (a cross section orthogonal to intersection ridgelines M) taken along a line Y-Y in FIG. 7.

On the other hand, the second wall surfaces 7B extend in the range from the convex curve surface 5b in the wall surface 5B of the protruding section 5 inside the inclined portions 4B of the cutting edge 4 to the positive rake face 2A inside the inclined portions 4B. As shown in FIG. 9, the second wall surfaces 7B are gradually inclined so as to be recessed at a constant tilt angle $\beta$ with respect to a direction perpendicular to the thickness direction in the cross section orthogonal to the intersection ridgelines M, as those are farther from the intersection ridgelines M. The tilt angle $\beta$ is smaller than the tilt angle $\alpha$ of the first wall surfaces 7A. As shown in FIG. 7, as the second wall surfaces 7B are farther from the both ends of the corner portion 4A along the inclined portions 4B, a width thereof in a direction orthogonal to the intersection ridgelines M gradually increases and a distance from the cutting edge 4 (the inclined portions 4B) of the intersection ridgelines between the second wall surfaces 7B and the positive rake face 2A.

In the second wall surfaces 7B, each part of the intersection points P and Q sides of the both ends thereof is formed as a convex curve surface such as a cone surface or a circular truncated cone surface that is inclined at the tilt angle $\beta$ so as to be convexly curved along the intersection ridgelines M. A part therebetween is formed as an inclined flat surface that extends to a direction perpendicular to the thickness direction at the tilt angle $\beta$ while smoothly adjoining the convex curve surfaces of them. In the part of the inclined flat surface, the protrusion height of the intersection ridgelines M in the thickness direction is substantially the same as a height of the cutting edge 4 in the corner portion 4A. Accordingly, as seen in a direction facing to the first wall surfaces 7A, the intersection ridgelines M are formed in a substantially semi-ellipse shape obtained by dividing ellipse in the major-axis direction. The intersection points P have a protrusion height higher than the intersection points Q in the thickness direction, and are disposed on a position slightly lower than the height of the cutting edge 4 in the corner portion 4A.

Figure 10:
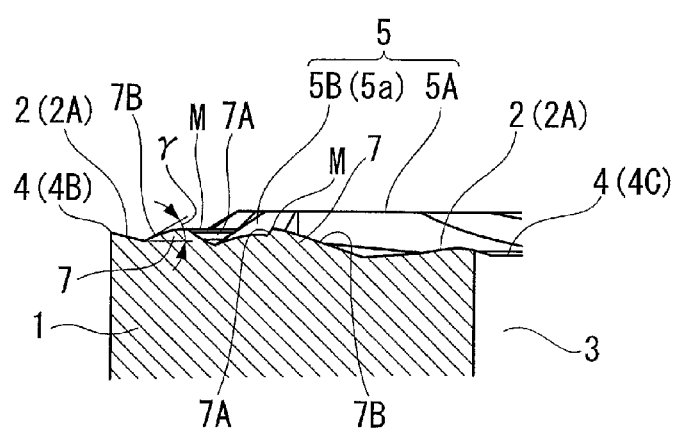
FIG. 10 is a sectional view taken along a line Z-Z in FIG. 7.

As shown in FIG. 10, in the cross section orthogonal to a part of the cutting edge 4 adjoined to the both ends of the corner portion 4A, the second wall surfaces 7B are also inclined so as to be gradually recessed as those are farther from the intersection ridgelines M. In addition, the tilt angle in the cross section gradually increases toward the rake face 2 side in that the parts of the intersection points Q are the convex curve surfaces as described above. On the intersection line formed between the rake face 2 and the second wall surfaces 7B to have the maximum tilt angle, a tilt angle $\gamma$ of the second wall surfaces 7B in the cross section orthogonal to the cutting edge 4 adjoined to the both ends of the corner portion 4A is set smaller than the tilt angle $\alpha$ of the first wall surfaces 7A in the cross section orthogonal to the intersection ridgelines M shown in FIG. 9. Accordingly, in the cross section orthogonal to the cutting edge 4, inclination of any part of the second wall surfaces 7B is lower than inclination of the first wall surfaces 7A in the cross section orthogonal to the intersection ridgelines M.

In the cutting insert configured as described above, the cutting chips are produced in the corner portion 4A of the cutting edge 4 at the time of a finish cutting for cutting small amount. In this case, the cutting chips scrape the rake face 2 inside the corner portion 4A and flow out through the gaps between the first wall surfaces 7A of the pair of convex sections 7. Then, the cutting chips are guided along the bisector L or guided by slidably contacting with the first wall surfaces 7A, collide against the convex curve surface 5a of the wall surface 5B facing to the corner portion 4A of the protruding section 5, and are curled helically by resistance of the wall surface 5B. Thus, the cutting chips are disposed of. In this case, the top portion 5A of the protruding section 5 has a higher protrusion height than the corner portion 4A and the convex sections 7. Therefore, even when the cutting chips produced at the time of the finish cutting extend thin, the cutting chips do not overflow out of the protruding section 5. Thus, it is possible to reliably dispose of the cutting chips.

In the medium cutting for cutting relatively large amount, the cutting is performed in the range from the corner portion 4A of the cutting edge 4 to the inclined portions 4B adjoined to an end thereof. In this case, the cutting chips flow out from the corner portion 4A and the inclined portions 4B into the inside of the rake face 2, and firstly contact with the second wall surfaces 7B of the convex sections 7. In the cutting insert configured as described above, the second wall surfaces 7B of the convex sections 7 are formed so that the intersection ridgelines M between the first wall surfaces 7A and that intersects with the wall surface 5B of the protruding section 5 at the intersection points P having a position lower than the top portion 5A of the protruding section 5. Accordingly, when the height of the top portion 5A or the distance between the cutting edge 4 and the second wall surfaces 7B is the same as compared with the cutting insert discussed in Japanese Unexamined Patent Application, First Publication No. 2006-272548 in which the intersection points P are located on the top portion 5A of the protruding section 5, it is possible to decrease an angle of a direction facing to the rake face 2 of the second wall surfaces 7B, for example, an angle in the cross section orthogonal to the cutting edge 4.

According to the cutting insert configured as described above, it is possible to reduce the resistance caused by scrape of the cutting chips even when the cutting chips produced at the time of the medium cutting contact with the second wall surfaces 7B. With such a configuration, the convex sections 7 is prevented from prematurely abrading from the second wall surfaces 7B, and thus it is possible to provide a cutting insert having long durability. In addition, the convex sections 7 extend from the wall surface 5B of the protruding section 5. Therefore, it is possible to sufficiently secure a thickness between the second wall surfaces 7B and the wall surface 5B of the protruding section 5, and thus it is possible to reliably prevent the convex section 5 from abrading. Meanwhile, the intersection points P are disposed on a position lower than the top portion 5A in the manner as described above, and thus the wall surface 5B of the protruding section 5 is highly inclined at an angle larger than the aforementioned angle inside the second wall surfaces 7B. Therefore, the cutting chips blocked by contacting with the second wall surfaces 7B are curled helically by colliding against the wall surface 5B, and performance for disposing of the cutting chips does not deteriorate even in the medium cutting.

In the cutting insert according to the embodiment, in the convex sections 7, the tilt angle $\beta$ of the second wall surfaces 7B in a cross section orthogonal to the intersection ridgelines M is set smaller than the tilt angle $\alpha$ of the first wall surfaces 7A in the cross section. In addition, the tilt angle $\gamma$ of the second wall surfaces 7B in a cross section orthogonal to a part of the cutting edge 4 adjoined to the both ends of the corner portion 4A is set smaller than the tilt angle $\alpha$. Accordingly, particularly at the time of the medium cutting, it is possible to further effectively prevent the convex section 7 from abrading by the cutting chips produced in the part of the cutting edge 4 adjoined to the both ends of the corner portion 4A. In addition, the tilt angle $\alpha$ shown in FIG. 9 is set by 45 degrees, but the tilt angle $\gamma$ shown in FIG. 10 is set by 27.012 degrees. In addition, in the second wall surfaces 7B, a part of intersection points Q side between the rake face 2 and the intersection ridgelines M where the first wall surfaces 7A intersects with the second wall surfaces 7B are formed as the aforementioned convex curve surface. Therefore, at the time of the medium cutting, it is possible to reduce an area contacting with the cutting chips while the cutting chips scrape on the rake face 2 (the positive rake face 2A) in the range from the inclined portions 4B of the cutting edge 4. As a result, it is possible to further reduce resistance and abrasion caused by the cutting chips.

On the contrary, the cutting chips produced at the time of the finish cutting is formed thin as described above, the abrasion amount of the first wall surfaces 7A is small even when the tilt angle $\alpha$ is set large. Accordingly, the tilt angle $\alpha$ is larger than the tilt angles $\beta$ and $\gamma$, and the cutting chips produced at the time of the finish cutting are guided to the wall surface 5B facing to the corner portion 4A of the protruding section 5 and collide against the wall surface 5B. Thus, it is possible to reliably dispose of the cutting chips. In the embodiment, the wall surface 5B facing to the corner portion 4A of the protruding section 5 is formed as a convex curve surface 5a curved along the arc of the cutting edge 4 in the corner portion 4A. Therefore, it is possible to reduce the resistance caused by the cutting chips guided and colliding in such a manner even in the case of the finish cutting.

According to the first embodiment, the rake face 2 inside the corner portion 4A of the cutting edge 4 is formed as a positive rake face 2A configured by the plurality of positive rake face portions so as to be adjoined to the first wall surfaces 7A of the convex sections 7 or the wall surface 5B facing to the corner portion 4A of the protruding section 5. Accordingly, the first wall surfaces 7A can extend by making a depth from the intersection ridgelines M to the innermost part of the rake face 2. Accordingly, even when the medium cutting abrades the convex sections 7 from the second wall surface 7B sides, the first wall surfaces 7A of the convex sections 7 can remain in the innermost part side. Thus, it is possible to maintain performance for disposing of the cutting chips even when using the finish cutting having small machining allowance. In addition, as shown in FIG. 8, the wall surface 5B facing to the corner portion 4A side of the protruding section 5 can be steeply formed at a large angle with respect to the rake face 2. Thus, it is possible to further reliably dispose of the cutting chips by using the resistance of the wall surface at the time of the finish cutting.

Figure 11:
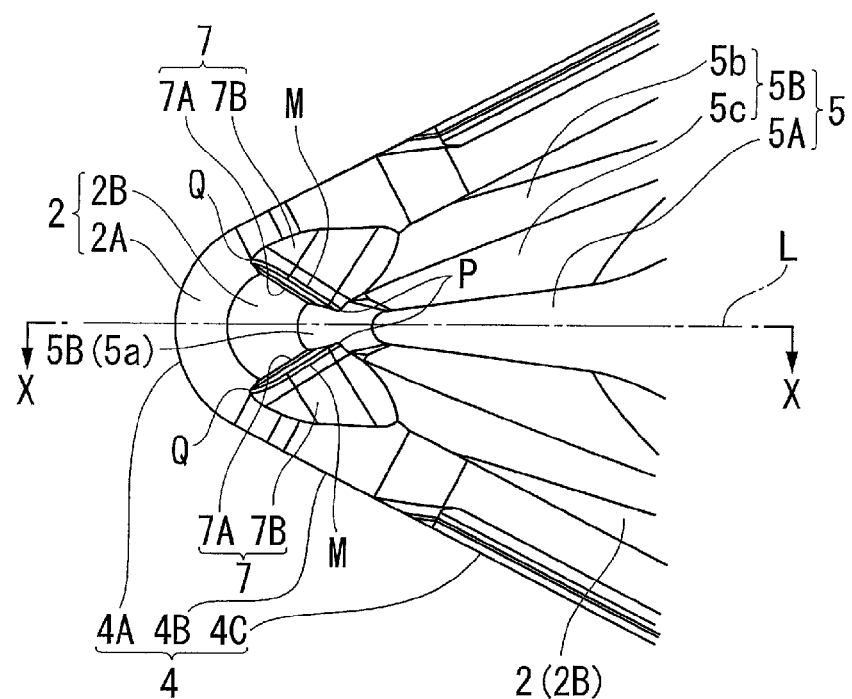
FIG. 11 is an enlarged perspective view illustrating the periphery of a corner portion 4A of a cutting edge 4 according to a second embodiment of the present invention.
Figure 12:
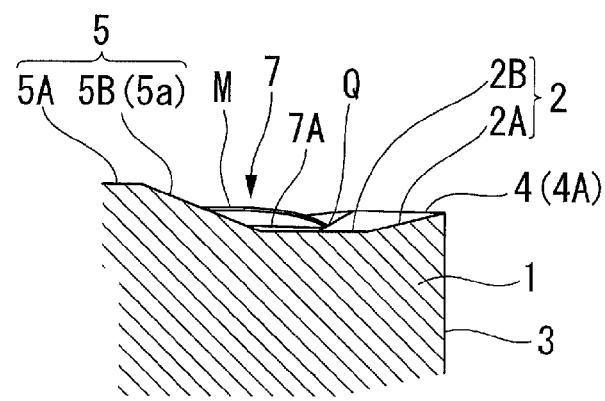
FIG. 12 is a sectional view taken along a line X-X in FIG. 11.

However, when inclination of the wall surface 5B with respect to the rake face 2 is steep, cutting chips blocking may occur in the finish cutting. In this case, in the same manner as a second embodiment as shown in FIGS. 11 and 12, the part of the rake face 2 facing to the corner portion 4A of the cutting edge 4 is sequentially formed of one or the plurality of positive rake face 2A facing to the inside from the cutting edge 4 side and the flat rake face 2B perpendicular to the thickness direction. In addition, the flat rake face 2B inside the corner portion 4A of the cutting edge 4 according to the second embodiment is disposed at a position, which protrudes in the thickness direction, higher than the flat rake face 2B inside the linear portions 4C of the cutting edge 4. In addition, in the case where there are common elements among the first embodiment, the second embodiment, and third to fifth embodiments to be described later, those elements will be referenced by the same reference numerals and detailed description thereof will be omitted.

Figure 13:
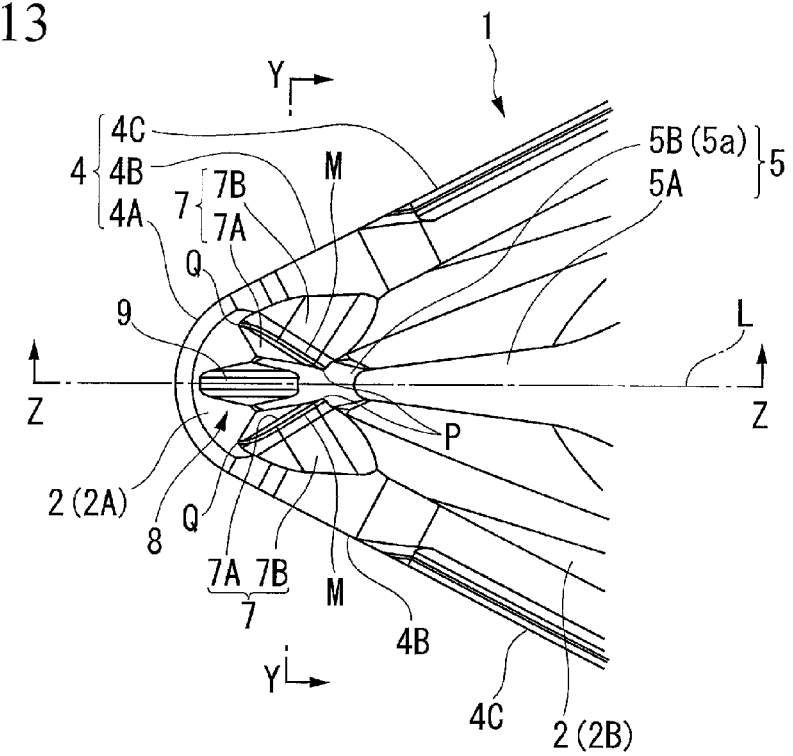
FIG. 13 is an enlarged perspective view illustrating the periphery of a corner portion 4A of a cutting edge 4 according to a third embodiment of the present invention.
Figure 14:
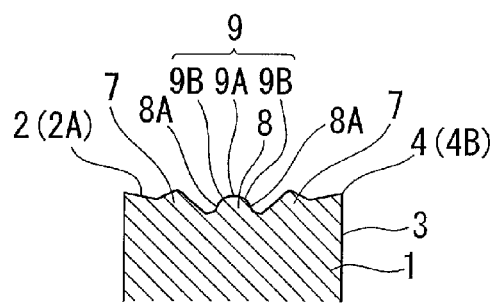
FIG. 14 is a sectional view taken along a line Y-Y in FIG. 13.
Figure 15:
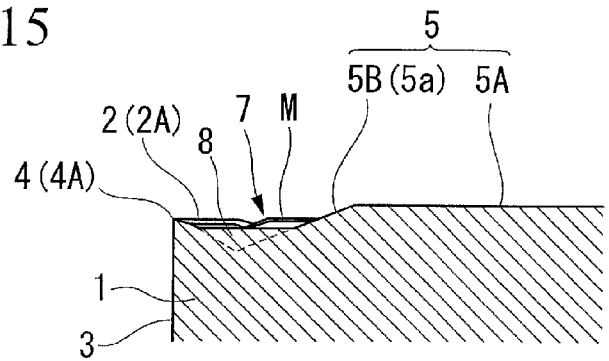
FIG. 15 is a sectional view taken along a line Z-Z in FIG. 13.
Figure 16:
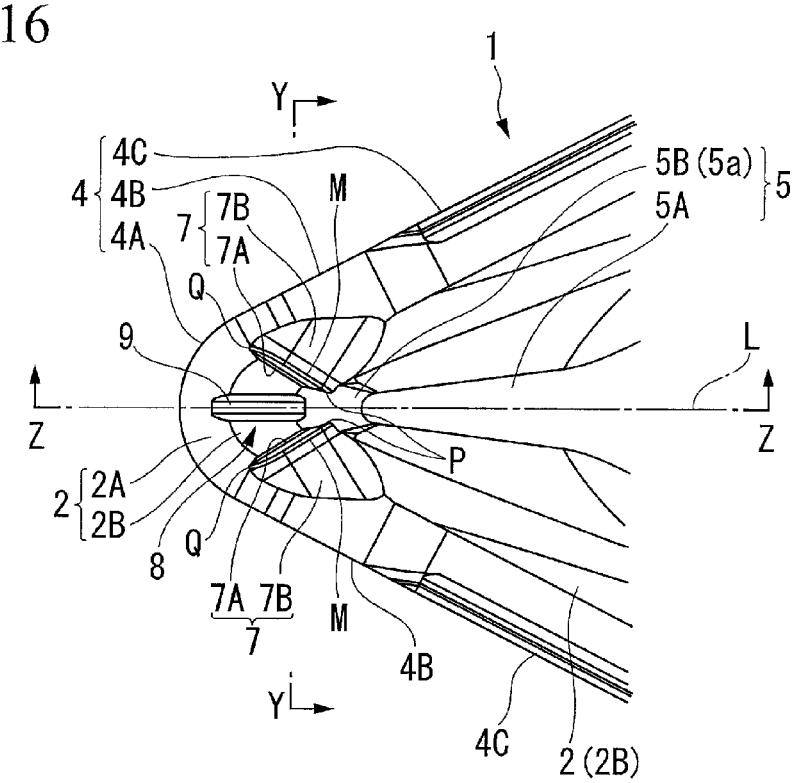
FIG. 16 is an enlarged perspective view illustrating the periphery of a corner portion 4A of a cutting edge 4 according to a fourth embodiment of the present invention.
Figure 17:
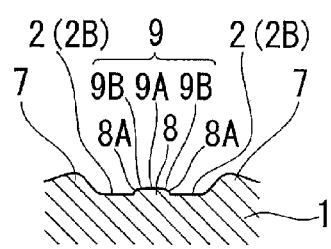
FIG. 17 is a sectional view taken along a line Y-Y in FIG. 16.
Figure 18:
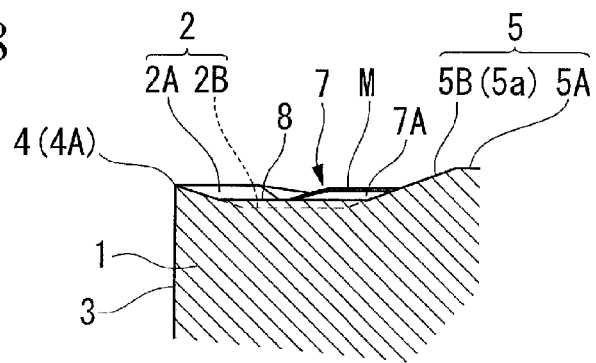
FIG. 18 is a sectional view taken along a line Z-Z in FIG. 16.
Figure 19:
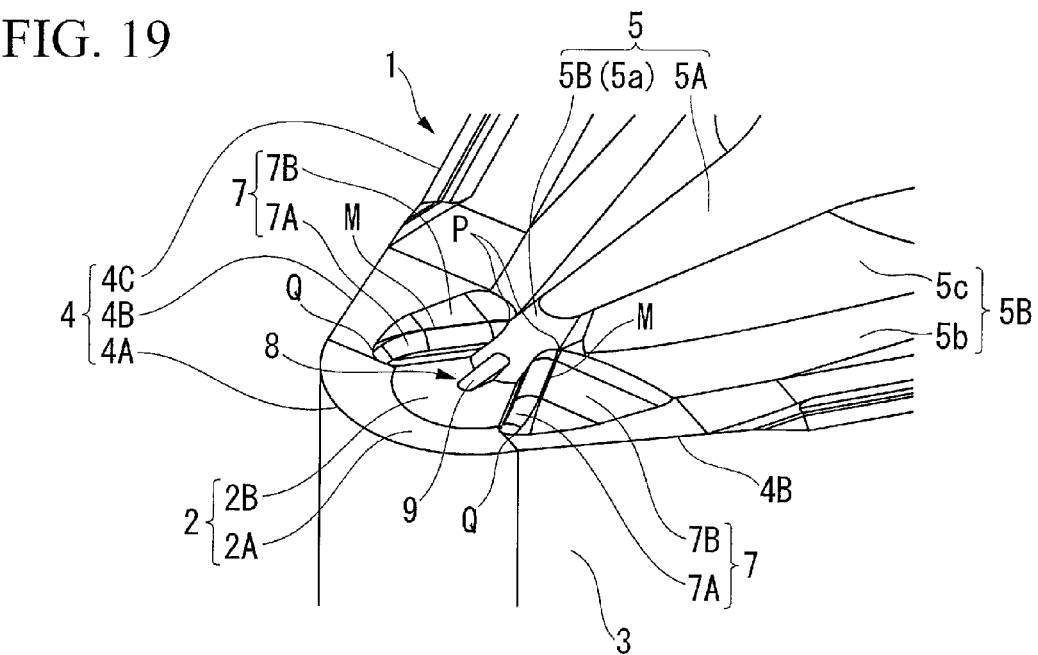
FIG. 19 is an enlarged perspective view illustrating the periphery of a corner portion 4A of a cutting edge 4 according to a fifth embodiment of the present invention.

The third embodiment shown in FIGS. 13 to 15, the fourth embodiment shown in FIGS. 16 to 18, and the fifth embodiment shown in FIGS. 19 to 24 are characterized in that the rib section 8 is formed along the bisector L on the rake face 2 inside the corner portion 4A according to the first and second embodiments. In the third and fourth embodiments, the rib section 8 extends from a position of the cutting edge 4 more inside than the convex sections 7 toward the inside in a direction of the bisector L. A width thereof is set by a narrower width than a distance between the first wall surfaces 7A of the both convex sections 7. There is a distance between the rib section 8 and the convex sections 7, and a protrusion height thereof in the thickness direction is set lower than a protrusion height of the convex sections 7.

In addition, the rib section 8 is formed in a convex V shape (the third embodiment) or a isosceles trapezoid shape (fourth embodiment) of which the end width decreases as it gets closer to a protruding ridge portion 9 side of the tip protruding from the rake face 2 in the thickness direction, as shown in FIGS. 14 and 17, in the cross section orthogonal to the bisector L in the thickness direction. The protruding ridge portion 9 includes a planar protruding top face 9A perpendicular to the thickness direction in the cross section and the pair of protruding ridgeline portions 9B having a convex curve shape such as a convex arc that smoothly adjoin the pair of side surface 8A of the rib section 8 formed along with the protruding top face 9A in a the convex V shape.

In the third and fourth embodiments, a protrusion height of rib section 8 in the thickness direction is set by a constant value (that is, the protruding top face 9A is formed to extend in perpendicular to the thickness direction and in parallel to the top portion 5A of the protruding section 5). In addition, the positive rake face 2A as described above is formed on the rake face 2 of the corner portion 4A, and a protrusion height of the convex sections 7 is equal to a protrusion height of the cutting edge 4 in the corner portion 4A. Accordingly, the rib section 8 having a relatively lower protrusion height has a distance between the front end thereof and the cutting edge 4 (the corner portion 4A) as seen from plane, and protrudes and extends from a bit of the inside thereof to the rake face 2. The front end thereof is located on a position closer to the corner portion 4A than the intersection points Q between the rake face 2 and the intersection ridgelines M of the convex sections 7 in the direction of bisector L. In the third embodiment, the front end of the rib section 8 is located on the positive rake face portion of the inside opposite to that of the cutting edge 4 side in the plurality of the positive rake face portions. In the fourth embodiment, the front end is located on the positive rake face 2A of the cutting edge 4 side opposite to the flat rake face 2B of the inside.

According to the fifth embodiment, the part of the rake face 2 facing to the corner portion 4A of the cutting edge 4 as described in the second and fourth embodiments includes the positive rake face 2A facing to the inside from the cutting edge 4 and the flat rake face 2B perpendicular to the thickness direction. In this case, the rib section 8 extends so as to be gradually uplifted in the thickness direction as it moves from a position more inside than the convex sections 7 on the flat rake face 4B toward the inside of the corner portion 4A in the direction of the bisector L. The width thereof, the protrusion height thereof in the thickness direction, and shape of the cross section orthogonal to the bisector L in the thickness direction are the same as the third or the fourth embodiment.

Figure 20:
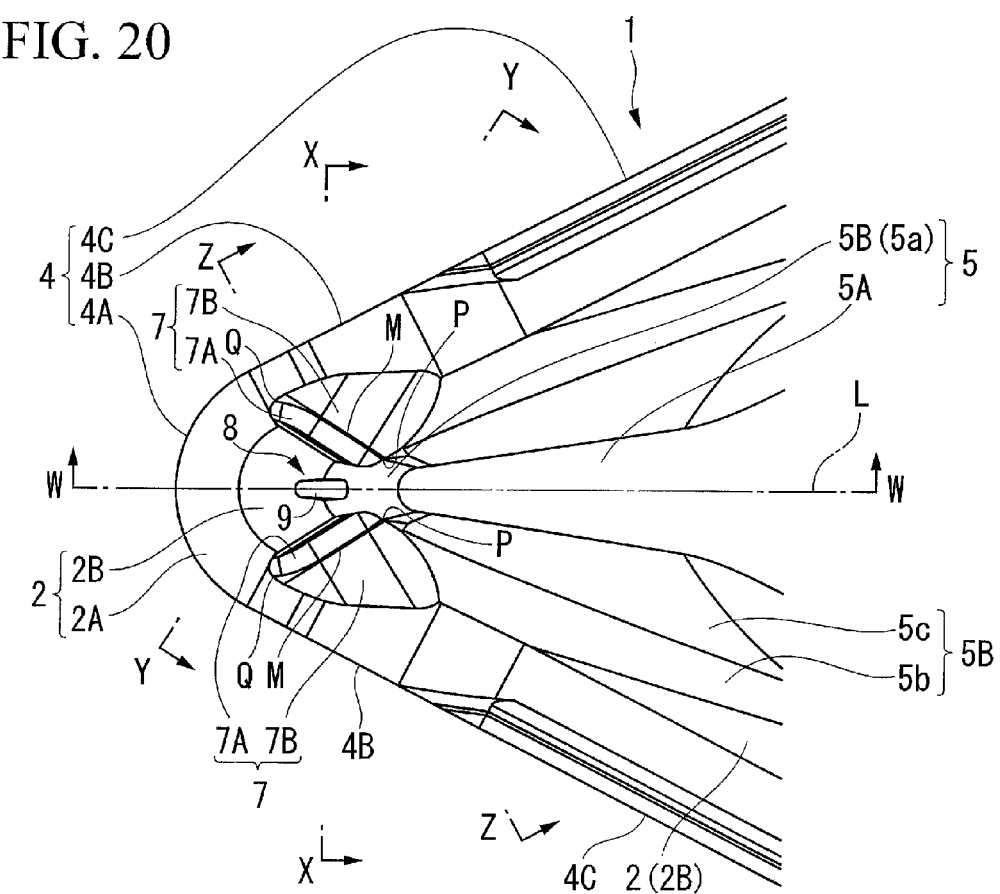
FIG. 20 is an enlarged perspective view illustrating the periphery of the corner portion 4A of the cutting edge 4.
Figure 21:
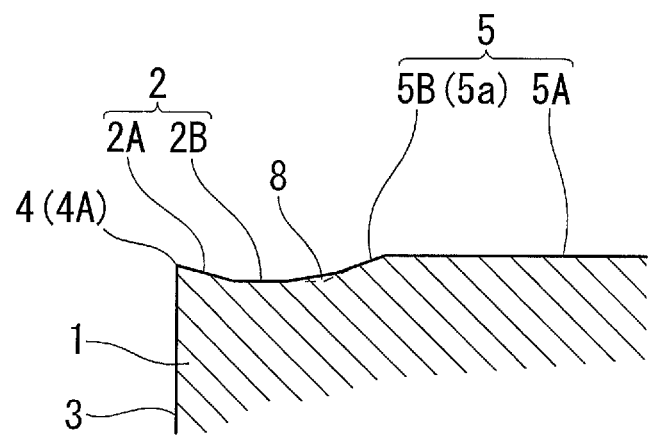
FIG. 21 is a sectional view taken along a line W-W in FIG. 20.
Figure 22:
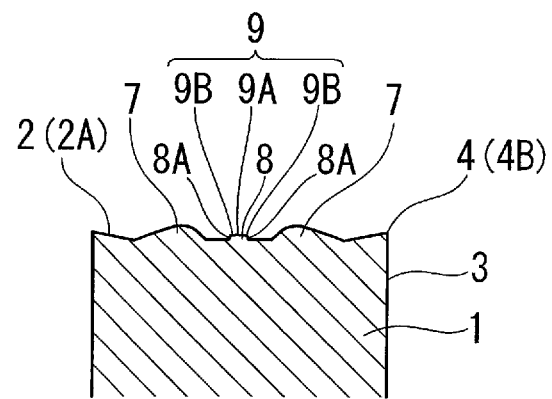
FIG. 22 is a sectional view taken along a line X-X in FIG. 20.
Figure 23:
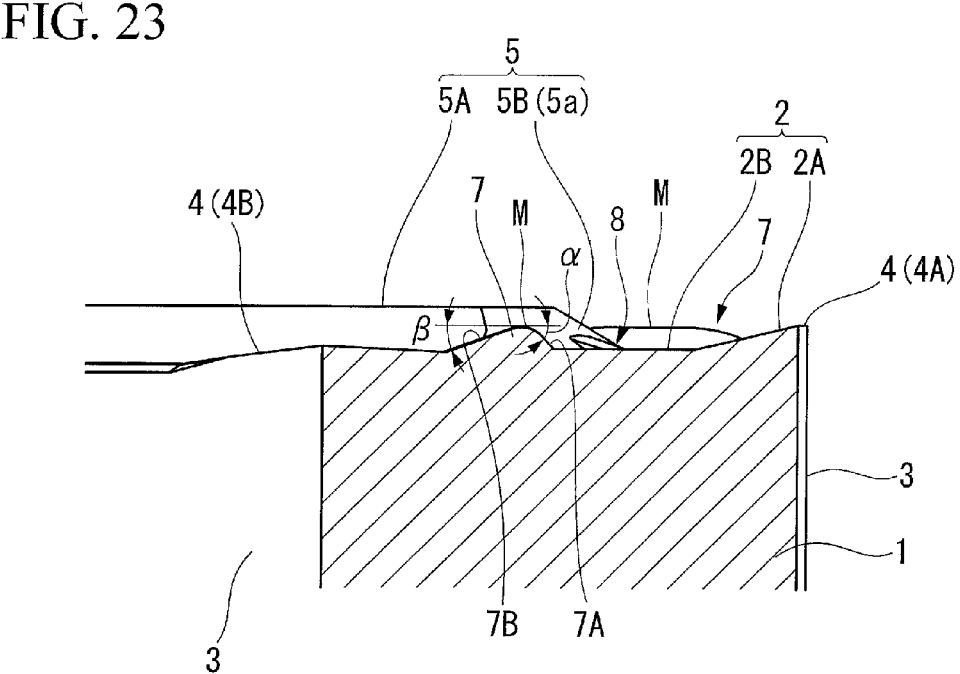
FIG. 23 is a sectional view (a cross section orthogonal to intersection ridgelines M) taken along a line Y-Y in FIG. 20.
Figure 24:
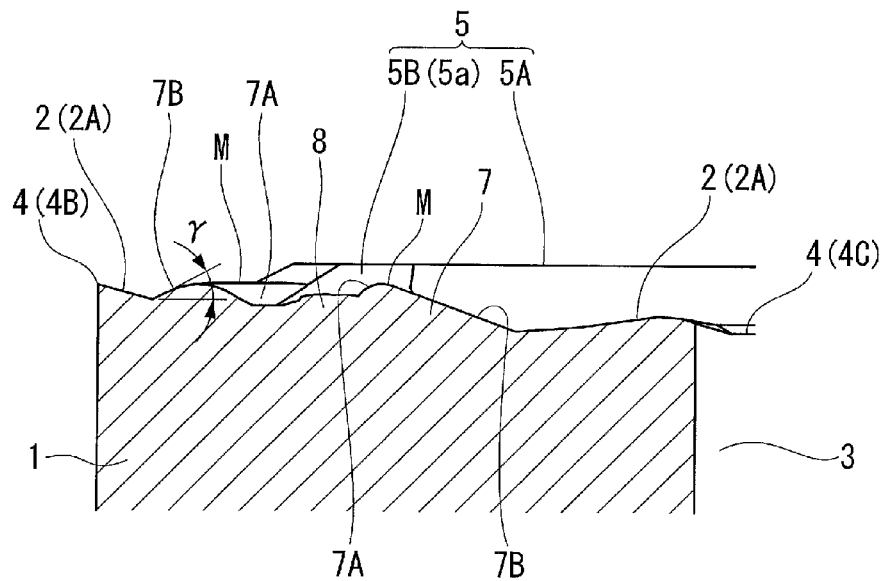
FIG. 24 is a sectional view taken along a line Z-Z in FIG. 20.

Meanwhile, the rear end of the rib section 8 in the inside of the corner portion 4A opposite to the cutting edge 4 side adjoins a part of the convex curve surface 5a facing to the corner portion 4A of the wall surface 5B of the protruding section 5 in the third to fifth embodiments. With such a configuration, the rib section 8 according to the third to fifth embodiments is formed in a peninsular shape extending from the front end of the protruding section 5 of which a width of the end decreases toward the corner portion 4A with a narrower width, as seen from plane, as shown in FIGS. 13, 16, and 20. In addition, the rib section 8 according to the third and fourth embodiment is formed to bridge the wall surface 5B of the protruding section 5 and the positive rake face 2A of the rake face 2 formed as a valley having a concave shape as shown in FIGS. 15 and 18, in a cross section parallel to the thickness direction along the bisector L.

In the cutting insert including the rib section 8 according to the third to fifth embodiments, the rib section 8 can control the cutting chips produced by the cutting edge 4 at the time of the finish cutting where cutting amount is small and the corner portion 4A of the cutting edge 4 is mainly used, in the lathe turning and the copy turning. Here, the lathe turning pushes out the insert body 1 in parallel to a rotational axis line of a work, the copy turning pushes out the insert body 1 in not only the direction parallel to the rotational axis line but also the other directions by copying an outward form of the work. That is, at the time of the finish cutting in the lathe turning, a part of the corner portion 4A having a small width on the bisector L is mainly used, and cutting chips having a small width are produced by the part. The cutting chips flow out the rake face 2 inside the corner portion 4A along the bisector L, and move up on the protruding ridge portion 9 of the rib section 8 protruding from the rake face 2 onto the bisector L.

Then, the cutting chips moving up on the rib section 8 as described above are curled helically by resistance caused by scraping on the protruding ridge portion 9. At this time, the cutting chips collide against any one of the first wall surfaces 7A of the pair of convex sections 7 which are located on the inside of the both sides of the rib section 8 and of which a protrusion height is higher than that of the rib section 8. Thus, the outflow direction of the cutting chips is controlled and the cutting chips are curled, so that the cutting chips are disposed of. In addition, even when the transfer speed is high, it is possible to dispose of the cutting chips by colliding against the part of the convex curve surface 5a of the wall surface 5B along the bisector L of the protruding section 5 from the rib section 8.

Meanwhile, at the time of the finish cutting in the copy turning, a part of the corner portion 4A in the range from the bisector L of the corner portion 4A of the cutting edge 4 to an end of the corner portion 4A in the transfer direction is mainly used in the cutting, but cutting chips having a small width are produced by the part of the cutting edge 4 in the range. The cutting chips flow out the rake face 2 inside the corner portion 4A along the bisector L, and are curled helically by resistance caused by scraping on the rake face 2. Then, the cutting chips scraping on the rake face 2 collide against the side surface 8A of the rib section 8 lower than the convex sections 7 convexly formed on the bisector L. Thus, the outflow direction of the cutting chips is controlled and the cutting chips are disposed of without an occurrence of blocking. In addition, when the cutting chips are produced on the bisector L of the corner portion 4A during copying an outward form of the work even in the copy turning, the cutting chips are disposed of by moving up on the rib section 8 in the same manner as described above.

In addition, at the time of the medium cutting for cutting larger amount than the finish cutting in the lathe turning and the copy turning, a protrusion height of the rib section 8 is set lower than the convex sections 7. Thus, the rib section 8 scarcely participates in the process for disposing of the cutting chips and the process for disposing of the cutting chips are performed by the second wall surfaces 7B of the convex sections 7. However, when the convex sections 7 had been abraded, in the third to fifth embodiments, the rib section 8 is formed. Thus, it is possible to dispose of the cutting chips produced in the medium cutting by colliding against the rib section 8.

According to the third to fifth cutting insert, it is possible to reliably dispose of not only the cutting chips having a relatively large width produced at the time of the medium cutting but also the cutting chips having a small width produced at the time of the finish cutting in the lathe turning and particularly in the copy turning. Accordingly, it is possible to prevent that the cutting chips are insufficiently disposed of and the outflow direction is also unstable, for example, the cutting chips get entangled in a tool body such as a byte maintaining the insert body 1, and thus cutting operation can not be continued, or the cutting chips comes in contact with a processing surface of a work where the finish cutting is performed, and thus products is damaged by the cutting chips.

In addition, particularly, in the third and the fourth embodiments, the cutting edge 4 side of the rake face 2 inside the corner portion 4A is formed as the positive rake face 2A, and the wall surface 5B of the protruding section 5 is formed so as to be gradually uplifted toward the top portion 5A in the same manner as the first and the second embodiments. On the contrary, the rib section 8 is formed so that the protruding ridge portion 9 is uplifted from the positive rake face 2A and extends parallel in the thickness direction along the bisector L. Accordingly, it is possible to secure a length of the bisector L direction and a protrusion height that is lower than the convex sections 7 but is sufficient for the range from the rake face 2 to the rib section 8. Hence, when the cutting chips flow out along the bisector L like the finish cutting in the lathe turning, it is possible to apply necessary and sufficient resistance to the cutting chips moving up on the protruding ridge portion 9 of the rib section 8 and reliably curl the cutting chips without blocking thereof. In addition, even when the cutting chips are produced in the corner portion 4A closer to the transfer direction side than the bisector L like the finish cutting in the copy turning, it is possible to reliably control the cutting chips scraping on the rake face 2 by colliding against the side surface 8A of the rib section 8.

In addition, in the same manner as the third and the fourth embodiments, the rib section 8 protrudes to the wall surface 5B or the rake face 2, and thus resistance is applied to the cutting chips flowing out along the bisector L, or the cutting chips scraping the rake face 2 collide against the side surface 8A of the rib section 8. In this case, the protruding ridge portion 9 of the rib section 8 extends so as to be gradually uplifted in the thickness direction at an angle smaller than an angle of uplifting the wall surface 5B, from the front end of the rib section 8 to the inside, or so as to be gradually recessed at an angle smaller than the rake angle of the positive rake face portions or the positive rake face 2A where the front end of the rib section 8 is located. However, there is concern that, when there is small difference between the inclination angle and the angle of uplifting the wall surface 5B or the rake angle, the cutting chips can not be curled or can not be reliably controlled, or the cutting chips moves up on the protruding ridge portion 9 of the rib section 8 or causes blocking by colliding against the side surface 8A. Hence, it is preferred that the protruding ridge portion 9 be perpendicular to the thickness direction, or be inclined so as to be recessed at an extremely slight angle of five degrees or less with respect to the thickness direction.

Meanwhile, in the fifth embodiment, in the same manner as the second and the fourth embodiments, the rake face 2 inside the corner portion 4A of the cutting edge 4 is formed of the positive rake face 2A and the flat rake face 2B of the inside. On the contrary, in a different way with the fourth embodiment, the rib section 8 has the front end thereof at a position more inside than the front ends (the intersection points Q) of the convex sections 7 in the direction of the bisector L on the flat rake face 2B. In addition, the rib section 8 is formed so as to adjoin the wall surface 5B of the protruding section 5 by being gradually uplifted as it gets closer to the inside in the direction of the bisector L. However, in the rib section 8 according to the fifth embodiment, there is no case where the protrusion height thereof in the thickness direction becomes higher than that of the convex sections 7 even in the intersection portion having the maximum protrusion height between the rib section 8 and the wall surface 5B.

In the cutting insert according to the fifth embodiment as described above, it is possible to reliably and smoothly dispose of the cutting chips produced by the various cutting conditions from the medium cutting to the finish cutting in the copy turning or the lathe turning by using the rib section 8. In addition, particularly, in the fifth embodiment, the rib section 8 extends from the rake face 2 more inside than the convex sections 7 in the direction of the bisector L. Therefore, it is possible to secure large space in a part surrounded by the wall surface 5B of the protruding section 9 and the first wall surfaces 7A of the convex sections 7 on the rake face 2 inside the corner portion 4A. Accordingly, it is possible to further reliably prevent the cutting chips from blocking at the time of the finish cutting.

On the other hand, the rib section 8 according to the fifth embodiment is gradually uplifted toward the inside in the direction of the bisector L. Therefore, even when the length thereof in the direction of the bisector L is short, the resistance applied to the cutting chips moving up does not decrease, and it is possible to reliably curl the cutting chips. In addition, in the cross section extending in the thickness direction along the bisector L, the intersection angle between the wall surface 5B of the protruding section 5 and the protruding ridge portion 9 of the rib section 8 can be set by an obtuse angle larger than an obtuse angle in the third and the fourth embodiments. Accordingly, it is possible to prevent the cutting chips from blocking in the intersection portion and smoothly discharge the cutting chips curled helically as described above.

In addition, in the third to fifth embodiments, the rib section 8 is formed in a isosceles trapezoid shape or a substantially convex V shape of which the end width decreases as it gets closer to a protruding ridge portion 9 side in the thickness direction, in the cross section orthogonal to the bisector L in the thickness direction. Accordingly, when some inclination is applied to the side surface 8A, for example, the intersection angle between the side surface 8A and the rake face 2 inside the corner portion 4A serving as the positive rake face 2A can be set by an obtuse angle as shown in FIG. 14. Accordingly, even when the cutting chips produced in the corner portion 4A in the transfer direction of the bisector L collide against the side surface 8A of the rib section 8 from the rake face 2 in the same manner as the finish cutting particularly in the copy turning, it is possible to prevent the cutting chips from blocking at a corner portion where the rake face 2 intersects with the side surface 8A. As a result, it is possible to further reliably control the cutting chips.

Meanwhile, the protruding ridge portion 9 of the rib section 8 has the protruding top face 9A planar in the cross section orthogonal to the bisector L. In the same manner as the finish cutting particularly in the lathe turning, when the cutting chips flowing out along the bisector L move up on the protruding ridge portion 9 and scrape thereon, it is possible to increase resistance with respect to the cutting chips by increasing the contact area between the cutting chips and the protruding ridge portion 9. Thus, it is possible to further reliably dispose of the cutting chips by curling the cutting chips. Moreover, in that the protruding ridge portion 9 itself extends in parallel to the top portion 5A of the protruding section 5 along the bisector L as described above, the protruding ridge portion 9 is formed in parallel to the top portion 5A or the protruding top face 9A, that is, in perpendicular to the thickness direction, and can helps to further reliably dispose of the cutting chips.

In addition, in the protruding ridge portion 9 of the rib section 8 where the protruding top face 9A planar in the cross section orthogonal to the bisector L is formed as described above, the protruding ridgeline portions 9B is formed in a convex curve shape in the cross section on the intersection ridgelines portion between the side surface 8A of the rib section 8 and the protruding top face 9A. However, the cutting chips colliding against the side surface 8A at the time of finish cutting in the copy turning as described above flow out while moving up on the side surface 8A and slidably contacting with the protruding ridgeline portions 9B finally. However, the protruding ridgeline portions 9B is formed in a cross section convex curve shape. Thus, for example, even when a change of a position where the cutting chips collide against the protruding ridgeline portions 9B is caused by a change of the outflow direction of the cutting chips C with respect to the rake face 2 in the copy turning, it is possible to stably apply resistance to the cutting chips in a normal line direction in a contact point between the cutting chips and the protruding ridgeline portions 9B in the cross section. Accordingly, it is possible to further reliably control and dispose of the cutting chips.

In the present invention as described above, the protruding ridge portion 9 of the rib section 8 includes the protruding top face 9A planar in the cross section and the protruding ridgeline portions 9B formed in a cross-sectional convex curve shape on the intersection ridgelines portion between the protruding top face 9A and the side surface 8A. Instead of the configuration just described above, for example, in the cutting insert used only in the copy turning, the entire protruding ridge portion 9 may be formed as the protruding ridgeline portions 9B having a convex curve shape such as a semi-arc in the cross section. Conversely, in the cutting insert used only in the lathe turning, the protruding ridgeline portions 9B is not formed on the aforementioned protruding ridge portion 9, and the side surface 8A of the rib section 8 and the protruding top face 9A planar in the cross section may be formed to intersect with an angle, and a larger area of the protruding top face 9A may be employed.

In addition, in the third to fifth embodiments, the rib section 8 is formed in a peninsular shape extending from the protruding section 5 to the wall surface 5B of the protruding section 5 inside the corner portion 4A in the direction of the bisector L. However, the rib section 8 may be formed in an isolated island shape extending in the direction of the bisector L but separated from the protruding section 5. As described above, when the rib section 8 is formed in an isolated island shape separated from the protruding section 5, it is possible to decrease a length thereof in the direction of the bisector L. Accordingly, for example, when the cutting chips easy to be broken into pieces by work material are produced, it is possible to suppress an increase of resistance in cutting by preventing the cutting chip from applying unnecessary resistance.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A cutting insert having a polygonal plate shape comprising:
    a rake face having a polygonal shape with corners and a periphery;
    flank faces connected to the periphery of the rake face to form a peripheral border between the rake face and the flank faces;
    a cutting edge which is formed on the peripheral border and has a corner portion formed at one of the corners;
    a protruding section formed on the rake face along a bisector of the one of the corners of the rake face and apart from the corner portion of the cutting edge; and
    a pair of convex sections respectively formed on the rake face at both sides of the bisector so that each of said convex sections extends from the protruding section toward the cutting edge; wherein
    each of said convex sections has a first wall surface, a second wall surface intersecting with the first wall surface, and an intersection ridgeline between the first and second wall surfaces;
    each of the intersection ridgelines of the convex sections is formed to extend from a wall surface of the protruding section toward the cutting edge so that the intersection ridgelines are gradually separated from each other as they approach the corner portion of the cutting edge;
    the first wall surface of each convex section is formed to incline from the intersection ridgeline toward the rake face as it approaches the corner portion of the cutting edge;
    the second wall surface of each convex section is formed to incline from the intersection ridgeline toward the rake face as it approaches the cutting edge;
    the intersection ridgelines are formed to intersect with the wall surface of the protruding section at a position lower than a top portion of the protruding section;
    a tilt angle of the second wall surface in a cross section orthogonal to a part of the peripheral border closest to the second wall surface with respect to a direction perpendicular to the rake face is smaller than a tilt angle of the first wall surface in the cross section orthogonal to the intersection ridgelines closest to the second wall surface with respect to a direction perpendicular to the rake face
    the first wall surfaces are formed as an inclined flat surface; and
    the second wall surfaces are formed as a convex curve surface convexly curved along the intersection ridgelines; and
    the intersection ridgeline makes an acute angle with respect to a part of the peripheral border closest to the intersection ridgeline.

2. The cutting insert according to claim 1, wherein
    a wall surface of the protruding section facing the corner portion of the cutting edge between the first wall surfaces of the pair of convex sections is formed as a convex curve surface curved along the corner portion of the cutting edge.

3. The cutting insert according to claim 1, wherein
    a rib section having a lower protrusion height than the convex section and a narrower width than a distance between the first wall surfaces is formed along the bisector between the first wall surfaces of the pair of convex sections on the rake face inside the corner portion.

4. The cutting insert according to claim 3, wherein:

the protrusion height of the top portion in the protruding section is a higher planar surface than the cutting edge in the corner portion;

the wall surface of the protruding section is an inclined surface that is gradually uplifted toward the top portion as it gets closer to the inside of the corner portion;

the rake face inside the corner portion includes a positive rake face that is gradually recessed as it gets closer to the inside of the corner portion; and a protruding ridge portion of the rib section is formed at a distance away from the cutting edge and extends so as to be parallel to the top portion, be gradually uplifted with a lower inclination than the wall surface of the protruding section, or be gradually recessed with a lower inclination than the positive rake face, toward the inside of the corner portion from the positive rake face that is a position closer to the cutting edge than the convex section in a direction of the bisector.

5. The cutting insert according to claim 3, wherein:

the protruding section is a planar surface in which the protrusion height of the top portion is higher than the cutting edge in the corner portion;

the wall surface of the protruding section is an inclined surface that is gradually uplifted toward the top portion as it gets closer to the inside of the corner portion;

the rake face inside the corner portion includes a positive rake face that is gradually recessed as it gets closer to the inside of the corner portion and a flat rake face inside the positive rake face; and a protruding ridge portion of the rib section is formed at a distance away from the cutting edge and extends so as to be gradually uplifted with a lower inclination than the wall surface of the protruding section toward the inside of the corner portion from the flat rake face.

6. The cutting insert according to claim 1, wherein the intersection point between the intersection ridgeline and the wall surface has a protrusion height higher in the direction of thickness of the insert body than the intersection point between the intersection ridgeline and the rake face disposed at a distance away from the cutting edge.

* * * * *